United States Patent Office 2,975,081
Patented Mar. 14, 1961

2,975,081
COLORING OF ALUMINUM SURFACES

Ben H. Kirby, Jr., Lock Haven, Victor T. Humphreys, Jersey Shore, and Talfryn James, Lock Haven, Pa., assignors to Koppers Company, Inc., a corporation of Delaware No Drawing. Filed Apr. 16, 1959, Ser. No. 806,740

6 Claims. (Cl. 148—6.1)

This invention relates to a method of coloring oxide-coated aluminum surfaces. In one specific aspect, it relates to a method of applying organic water-insoluble colorants to oxide-coated aluminum to produce a remarkably light fast coloring on the surface of the aluminum.

The term "aluminum" as used herein includes both the metal aluminum and aluminum base alloys. "Oxide-coated aluminum" refers to an aluminum having an oxide coating artificially formed on the surface thereof by any of various electrical and chemical methods. Conveniently, the aluminum may be made the anode in an electrolytic cell containing an electrolyte, such as sulfuric acid, oxalic or chromic acid. When external electrical energy is impressed upon the cell, an oxide coating is formed on the anode. In another method, the aluminum is immersed in a suitable solution, generally alkaline, and the oxide coating is formed by chemical reaction without the use of external electrical energy.

Workers in the art have long been in quest for a satisfactory method for producing a light fast coloring on oxide-coated aluminum surfaces, particularly anodized aluminum surfaces. It is conventional to color anodized aluminum by forming an aqueous dye solution using water-soluble dyes at a carefully controlled pH, and dyeing the anodized aluminum surface therewith. Unfortunately, this process is subject to numerous disadvantages; in particular, the dye solution must be buffered and the pH thereof must be carefully controlled within narrow limits which vary with the particular dyestuff used. Furthermore, the method is limited to water-soluble dyestuffs which, as a class, generally do not provide good light fast coloring on oxide-coated aluminum surfaces, which is required for many applications. It is well known that increasing the number of solubilizing groups, e.g. $SO_3H$, $SO_3Na$, and the like, of a dye molecule tends to decrease markedly the light fastness obtained. Using an aqueous dye solution the dyeing time generally takes about 10 minutes and the temperature of the solution must be carefully controlled to avoid premature sealing of the oxide pores, which occurs at temperatures above about 70–80° C. in the presence of water. Salt formation in the aqueous dye solution is also a problem, since over a long period of time the build-up of various organic and inorganic salts causes a precipitation of the dye from the solution. Using the water-soluble dyestuffs it has been impossible to produce a colored aluminum in a light fast pastel shade.

It has also been proposed to color oxide-coated aluminum using a dye solution comprising a small percentage of dye dissolved in acetone or alcohol. These solvents are only suitable for use with a small class of dyestuffs.

Unfortunately, none of the known methods are suitable for applying water-insoluble colors to oxide-coated aluminum. The use of colloidal aqueous dispersions of the water-insoluble colors is inadequate, since the dispersed color particles are too large to penetrate the oxide pores. Alcohol, acetone and similar solvents are unsuitable as a means to carry the color into the oxide pores because of their water miscibility; when the oxide pores are sealed in a hot aqueous bath, the solvent containing the color bleeds through the pores into the sealing bath. The resulting colored panel is streaked or uneven in appearance. Furthermore, the color thus obtained is not light fast.

Quite surprisingly, we have discovered a novel method of coloring oxide-coated aluminum with a class of organic, water-insoluble colorants which are soluble in high-boiling automatic solvents to provide aluminum in a variety of remarkably light fast colors.

It is, therefore, an object of the invention to provide a new method for coloring oxide-coated aluminum, particularly anodized aluminum and to produce thereby colored aluminum surfaces for architectural, automotive and other decorative applications in a variety of light fast colors, including pastel shades thereof.

In accordance with the invention, a coloring solution, consisting essentially of an organic water-insoluble colorant dissolved in a substantially water-immiscible aromatic solvent having a boiling point of at least about 80° C., is formed. The colorant is then applied to oxide-coated aluminum surfaces at a temperature ranging between about room temperature or somewhat lower, if desired, and the boiling point of the particular solvent used. The light fastness of the color thus produced on the aluminum may be considerably enhanced by protecting the colorant within the oxide pores from unnecessary exposure. Conveniently, this is accomplished by sealing the pores of the oxide coating by immersing the aluminum in a hot aqueous bath or by other conventional sealing treatments.

We have already indicated that the aluminum suitable for use in the invention includes both aluminum metal and commercial aluminum alloys which may contain, for example, 5 percent or less of silicon, copper, magnesium, zinc, and other metals. The aluminum is oxide-coated, preferably by an anodic oxidation process conventional in the art. One excellent anodic oxidation process comprises making aluminum surface the anode in an electrolyte, comprising 12–18 percent by weight sulfuric acid in distilled water, at a current density of about 10–15 amperes per square foot at a temperature of about 70° F. for about one hour or less. The thickness of the aluminum oxide coating and the size and number of the pores can be carefully controlled as desired by varying the anodizing conditions.

After anodizing is completed it is preferable, although not essential, to pre-treat the anodized surfaces before coloring to remove any traces of the electrolyte that may be present. Conveniently, this may be accomplished by washing the anodized surfaces thoroughly in distilled water and then allowing them to soak in a 50 percent by weight aqueous solution of nitric acid for one to ten minutes at room temperature. After the nitric acid dip, the anodized surfaces are given a further rinse in distilled water, and thereafter dried. Whether or not the oxide-coated aluminum is pre-treated a thorough drying is preferred, since superficial moisture may interfere with the adsorption of color within the oxide pores. The oxide-coated surface can be thoroughly dried using an air blast or, alternatively, by immersing the surface in denatured alcohol followed by air drying.

The colorants useful in the present invention are the organic water-insoluble colorants which are soluble in high-boiling substantially water-immiscible aromatic solvents. The term "colorant" is used herein to include dyestuffs, dyestuff intermediates, and organic pigments. Generally speaking, the colorants comprise the anthraquinone dyestuffs, the anthraquinoid dyestuff intermediates, the fused ring anthraquinoid dyestuffs such as benzanthrone, the indigoid dyestuffs, the thioindigoid dyestuffs, the quinoline dyestuffs, the water-insoluble azo dyes, phthalocyanines, and the like. Specific colorants useful in the invention include, but are not limited to, those appearing hereunder in Table I.

TABLE I

| Colorant (Name or Structural Formula) | Old or New Color Index No. (If Given) |
|---|---|
| 9,10-anthraquinone | |
| 1,4-diaminoanthraquinone | |
| 1,4,5,8-tetraaminoanthraquinone | |
| 1,4-dimethylaminoanthraquinone | |
| 1-methylamino-4-p-toluidinoanthraquinone | C. I. Solvent Blue 11. |
| 1-amino-4-anilino-5-acetaminoanthraquinone | |
| 1-amino-4-anilinoanthraquinone | |
| 1-amino-2-methyl-4-p-toluidinoanthraquinone | |
| 1,2-dihydroxyanthraquinone | C. I. 58000. |
| 1-hydroxy-4-acetaminoanthraquinone | |
| 1-amino-2,4-dihydroxyanthraquinone | |
| 1-amino-2-methoxy-4-hydroxyanthraquinone | |
| 1,8-dihydroxy-4,5-dimethoxyaminoanthraquinone | |
| 1-hydroxy-4-p-toluidinoanthraquinone | |
| 1,8-dihydroxy-4-anilino-5-nitroanthraquinone | |
| 1,5-dihydroxy-4-anilino-8-aminoanthraquinone | |
| 1-hydroxy-5-nitroanthraquinone | |
| 1,4-diamino-2,3-dichloroanthraquinone | |
| 1-amino-2-phenoxy-4-hydroxyanthraquinone | |
| (3'-hydroxy-4'-carboxyphenyl)-1-aminoanthraquinone | |
| 1,5-di-p-toluidinoanthraquinone | |
| 1-bromo-5-benzoylaminoanthraquinone | |
| 1,4-diethylamino-5,8-dihydroxyanthraquinone | |
| 1,4-bis(hydroxyethylamino)-5,8-dihydroxyanthraquinone | |
| 1,9-anthrapyridone | |
| 4-p-toluidino-1'-methyl-1,9-anthrapyridone | |
| 1,9-anthrapyrimidine | |
| 4(p-chlorobenzoylamino)-1,9-anthrapyrimidine | C. I. 68400. |
| 1,9-anthrapyrimidone | |
| 1,2-pyrimidinoanthraquinone | |
| $CH_3CO-HN-\langle\rangle-N=N-\langle\rangle-OH$ with $CH_3$ | C. I. Disperse Yellow 3. |
| $ClC_6H_4$, $nC_4H_9$ N-⟨⟩-C=C(CN)-C(=O)-OC_2H_5 | C. I. Disperse Yellow 31. |
| $O_2N-\langle\rangle-N=N-\langle\rangle-NH-\langle\rangle$ | C. I. Disperse Orange 1. |
| $O_2N-\langle\rangle-N=N-\langle\rangle-NH_2$ | C. I. Disperse Orange 3. |
| $O_2N-\langle\rangle(Cl)-N=N-\langle\rangle(CH_3)-N(CH_2CH_2OH)_2$ | C. I. Disperse Red 5. |
| $O_2N-\langle\rangle(Cl)-N=N-\langle\rangle-N(C_2H_5)(C_2H_4OH)$ | C. I. Disperse Red 13. |
| $H_2N-\langle\rangle-N=N-\langle\rangle(CH_3)(OCH_3)-NH_2$ | C. I. Disperse Black 2. |
| [two fused quinoline–phthalide structures] | C. I. Solvent Yellow 33. |
| N-methyl-1-(N)-9-anthrapyridone-4-2'-dianthrimide | C. I. 68230. |

TABLE I—Continued
| Colorant (Name or Structural Formula) | Old or New Color Index No. (If Given) |
|---|---|
| 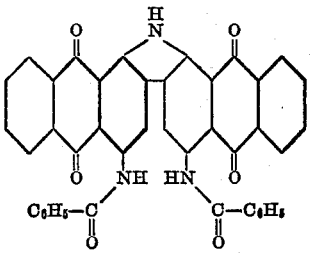 | C. I. Vat Black 27. |
| 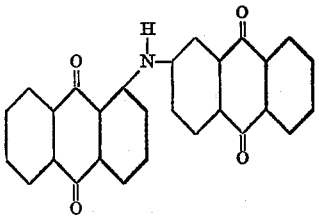 | C. I. 65015. |
| 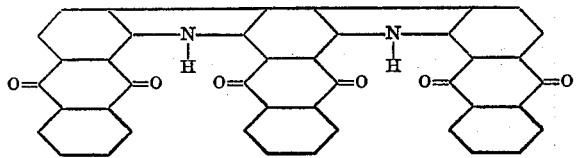 | C. I. Vat Brown 1. |
| 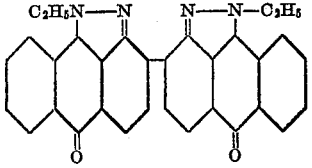 | C. I. Vat Red 13. |
| 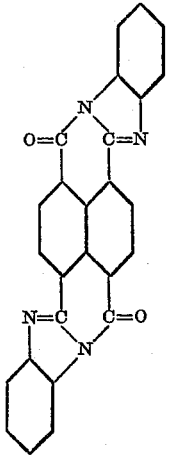 | C. I. Vat Orange 7. |
| 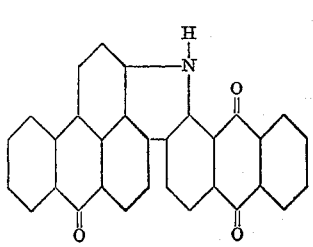 | C. I. Vat Green 3. |

TABLE I—Continued
| Colorant (Name or Structural Formula) | Old or New Color Index No. (If Given) |
|---|---|
|  | C. I. Vat Yellow 1. |
|  | C. I. Vat Red 35. |
|  | C. I. Vat Blue 4. |
|  | C. I. Vat Blue 6. |
|  | C.I. Vat Brown 31. |
|  | C.I. Vat Blue 1. |

TABLE I—Continued

| Colorant (Name or Structural Formula) | Old or New Color Index No. (If Given) |
|---|---|
| 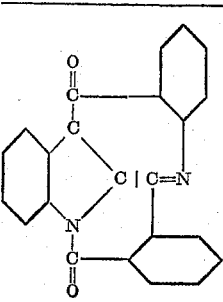 | C.I. 73100. |
| 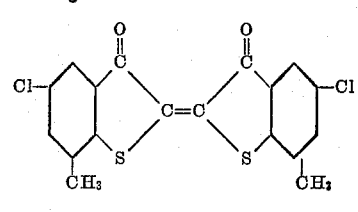 | C. I. Vat Violet 2. |
| 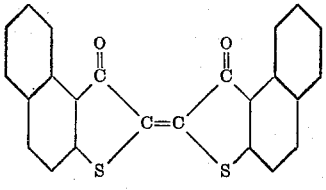 | C. I. Vat Brown 5. |
| 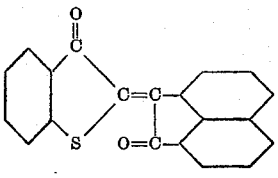 | C. I. Vat Red 45. |
| 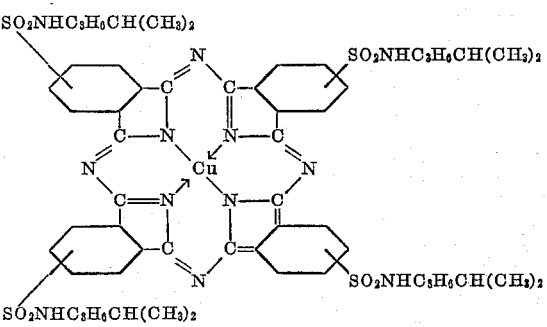 | C.I. Solvent Blue 25. |
| 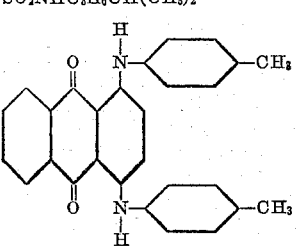 | C.I. Solvent Green 3. |

The coloring solution is formed by dissolving a colorant of the above-indicated class in an aromatic (or hydroaromatic) substantially water-immiscible solvent having a boiling point of at least about 80° C. The use of this particular class of solvents is essential to the present invention. We have already noted that water-miscible or water-permeable solvents are ineffective, because they bleed through the pores of the anodized aluminum during the sealing step and carry the colorant into the sealing bath. The resulting colored panels are streaked and uneven in appearance, and the color thus obtained is not light fast. Preferred solvents of the above-indicated class include nitrobenzene, mono, di and tri-chlorobenzenes, toluene, xylene, benzene, alkyl benzenes, hydroxybenzenes, ortho-chlorophenol, tetrahydronaphthalene, pyridine, quinoline, propiophenone, decalin, benzonitrile, phenylnitromethane, and mixtures thereof.

It is not necessary, for purposes of the invention, that a particular colorant be completely soluble in the selected solvent. If the solubility of the colorant in the solvent used is at least about 20 percent, the coloring solution, if the preferred amount of colorant is added thereto, will be sufficiently strong to color a panel in a light fast pastel shade.

The depth of shade of the particular color applied may be varied from light to dark by decreasing or increasing the concentration of colorant in the solvent. At the lower concentrations pastel shades are obtained. A practical minimum concentration of colorant required to obtain a light pastel shade is about 0.01 percent by weight. Excellent results are obtained using from about 0.5–2 percent by weight colorant. No particular advantage is seen in using a concentration of colorant greater than about 5 percent by weight, because of the excess usage of colorant involved.

It is advantageous, although not necessary, to protect the light fastness of the colored anodized aluminum by adding to the coloring solution a small amount, generally from about 0.1–0.5 percent by weight based upon the weight of the solvent used, of an ultraviolet light screening agent, e.g. 5-chloro-2-hydroxybenzophenone, 2,4-dibenzoylresorcinol, phenylsalicylate, and the like. the ultraviolet light screening agent enters the pores of the oxide coating along with the colorant and helps to prevent fading when the colored aluminum is exposed to extreme conditions of sunlight and heat.

The colorant may be applied to the aluminum surface by immersing the oxide-coated aluminum in the coloring solution or, alternatively, by spraying, flowing, brushing or rolling. During the coloring step the coloring solution is maintained at a temperature between about 20° C. and the boiling point of the particular solvent used. It is preferable to control the temperature of the coloring solution between about 50–70° C. to avoid evaporation of the solvent and any streaking on the coated surface that may occur because of the rapid evaporation of solvent when the aluminum is removed from the coloring solution.

Adsorption of the colorant by the oxide-coated aluminum surface occurs almost immediately after the metal is contacted with the coloring solution. When coloring is accomplished by dipping it is generally convenient to allow the coated aluminum to remain in the coloring solution for from one to ten minutes to assure maximum and uniform penetration by the colorant into the aluminum oxide pores.

After the coloring step has been completed, the excess coloring solution is drained from the surface of the aluminum. The anodic pores should be thereafter substantially completely sealed to protect the colored panel against heat, ultraviolet light, abrasion and contamination, if the colored aluminum is to be used for exterior applications. The sealing technique may be accomplished by any of the methods conventional to the anodized aluminum art, such as those described in Tosterud, U.S. Patent No. 2,008,733, assigned to the Aluminum Company of America. These methods comprise immersing the coated aluminum for a short period of time in hot or boiling water or a hot or boiling metal salt solution, preferably a metal acetate solution. A particularly useful method of sealing involves immersing the colored oxide-coated aluminum in a 0.5 percent by weight solution of nickel acetate in water at a temperature of about 98° C. The pH of the nickel acetate bath is controlled between about 5.0 and 5.8 by the addition of acetic acid. The coated aluminum is allowed to remain in the sealing bath for between about 5 and 10 minutes. Alternatively, the sealing bath may comprise 0.5 percent by weight nickel acetate, 0.1 percent by weight cobalt acetate, and 0.8 percent by weight boric acid dissolved in water. The boric acid serves to buffer the solution, thus making it easier to maintain the pH within the desired range. pH control is important in preventing sludge formation and avoiding conditions which would cause dissolution of the aluminum oxide coating.

After the colored anodized aluminum is removed from the sealing solution, it is rinsed with distilled water and thoroughly dried by methods hereinbefore described.

The dried, colored, oxide-coated aluminum may be polished by a light buffing action. The finished aluminum surface may be thereafter further protected by lacquering or waxing, if desired.

The colored aluminum panels, when prepared by the method of the invention, are remarkably light fast, even in faint pastel shades. Light fastness is an essential property for colored aluminum panels for architectural and outdoor usage, since such panels are continuously exposed to the heat and ultraviolet rays of the sun, and the fading normally caused thereby cannot be tolerated. Light fastness is conveniently measured by accelerated laboratory testing methods involving exposure of the colored surface to an artificial source of ultraviolet light. The "Atlas Carbon Arc Fade-O-Meter—Type FDAR," a commercially available apparatus of this type, is quite suitable for obtaining such measurements. The sample to be tested is placed in the "Fade-O-Meter" and exposed to the light source. An exposure time of 1,000 hours in the "Fade-O-Meter" with little or no change in the color of the sample being tested shows that the light fastness of the sample is excellent for most purposes. Colored panels produced by prior art methods cannot, in most cases, withstand such a prolonged exposure without objectionable fading, particularly when produced in light or pastel shades.

Our invention is further illustrated by the following examples.

Example I

A 1" x 6" panel of 99.3 percent aluminum was cleaned and degreased by immersion in an inhibited aqueous alkaline solution. The panel was then rinsed thoroughly with cold water and placed in a 50 percent by weight aqueous solution of nitric acid at room temperature for 30 seconds. After the nitric acid dip, the panel was again rinsed thoroughly with cold water. The aluminum panel was then anodized by making it the anode in a 15 percent by weight solution of chemically pure sulfuric acid in distilled water at 21° C. and treating it with an electric current, having a density of 12 amperes per square foot, for about one hour. The anodized panel was rainsed thoroughly in distilled water to remove all traces of acid and allowed to soak in a 50 percent by weight solution of nitric acid in distilled water for ten minutes. The panel was then thoroughly rinsed with distilled water and immersed in denatured alcohol to remove water from within the pores of the aluminum oxide coating.

A coloring solution was prepared by dissolving 2 grams of 1,4-dihydroxyanthraquinone in 1,446 grams of trichlorobenzene (e.g. a 0.14 percent by weight solution). The anodized aluminum panel was immersed in the coloring solution at a temperature of 50–60° C. Coloring took place almost immediately, although the aluminum was allowed to remain in the solution for ten minutes to insure complete penetration of the dye into the pores of the aluminum oxide. The panel was then removed from the solution and allowed to drain by holding it vertically above the bath. After the excess coloring solution had drained from the panel, it was allowed to dry thoroughly in air.

After drying, the pores of the aluminum oxide were sealed by immersing the panel in a sealing bath, comprising 5.6 grams nickel acetate, 1 gram of cobalt acetate, and 8.4 grams boric acid dissolved in 1,000 grams of distilled water, at a temperature of 98° C. for 5 minutes. The pH of the sealing bath was maintained at between 5 and 5.5 by the addition of a dilute solution of acetic acid in distilled water. After sealing had been completed, the aluminum panel was rinsed in a bath of distilled water at a temperature of about 98–100° C. and thereafter allowed to air dry.

The colored panel was polished lightly with pumice powder and thereafter coated with a nitrocellulose lacquer.

The finished panel was a deep crimson in color. It showed no appreciable change in shade after 1,000 hours exposure in a "Fade-O-Meter," which indicated that the color was exceptionally light fast.

It was interesting to note that the 1,4-dihydroxyanthraquinone, when dissolved in the coloring solution, appeared as a deep orange solution, while, in contrast, the color of the finished panel was a deep crimson, thus indicating the formation of an aluminum lake between the dye and the aluminum oxide coating.

*Example II*

The procedure of Example I was substantially repeated using a 0.5 percent by weight solution of 1,4-dihydroxyanthraquinone in nitrobenzene. The temperature of the coloring solution was maintained at 150–160° C. The finished panel had a very deep crimson color, which was especially light fast.

*Example III*

The procedure of Example I was substantially repeated, using as a coloring solution a 0.5 percent by weight solution of 1-hydroxyanthraquinone in nitrobenzene. A 1" x 6" panel of anodized aluminum alloy containing about 5 percent silicon as an alloying constituent was immersed in the coloring solution at a temperature at 150–160° C. The finished panel had a deep orange color of excellent light fastness.

*Example IV*

The procedure of Example III was repeated using 1-aminoanthraquinone as the colorant. The finished panel had a deep maroon color of excellent light fastness.

*Example V*

The procedure of Example III was repeated using as a colorant 1,2-diaminoanthraquinone. The finished panel had a deep maroon color of excellent light fastness.

*Example VI*

The procedure of Example III was repeated using as a colorant 1-amino-5-benzoylaminoanthraquinone. The finished panel had a deep bluish red color of excellent light fastness.

*Example VII*

The procedure of Example III was repeated using as a colorant 2-amino-4-benzoylaminoanthraquinone. The finished panel had a medium reddish brown color of excellent light fastness.

*Example VIII*

The procedure of Example III was repeated using as a colorant 2-amino-1,3-dibromoanthraquinone. The finished panel had a light brown color of excellent light fastness.

*Example IX*

The procedure of Example III was repeated using as a colorant 1-benzoylamino-4-chloroanthraquinone. The finished panel had a light brown color of excellent light fastness.

*Example X*

The procedure of Example III was repeated using as a colorant 1-amino-2,4-dibromoanthraquinone. The finished panel had a bright reddish brown color of excellent light fastness.

*Example XI*

The procedure of Example III was repeated using as a colorant 1,5-dibenzoylaminoanthraquinone. The finished panel had a pale fawn color of excellent light fastness.

*Example XII*

The procedure of Example III was repeated using as a colorant 1-bromo-4-benzoylaminoanthraquinone. The finished panel had a bluish red color of excellent light fastness.

*Example XIII*

The procedure of Example III was repeated using as a colorant 1-chloro-5-benzoylaminoanthraquinone. The finished panel had a dull orange color of excellent light fastness.

*Example XIV*

The procedure of Example III was repeated using as a colorant 1-bromo-4-benzoylaminoanthraquinone. The finished panel had a light yellow-brown color of excellent light fastness.

*Example XV*

The procedure of Example III was repeated using as a colorant 1,1'-dianthramide. The finished panel had a bluish brown color of excellent light fastness.

*Example XVI*

The procedure of Example III was repeated using as a colorant benzanthrone. The finished panel had a bright greenish yellow color of excellent light fastness.

*Example XVII*

The procedure of Example III was repeated using as a colorant benzanthraquinone. The finished panel had a dull grenish yellow color of excellent light fastness.

*Example XVIII*

The procedure of Example I was substantially repeated using as a coloring solution a 1 percent solution of a mixture of 1,4-di-p-toluidinoanthraquinone and 1-p-toluidino-4-hydroxyanthraquinone in trichlorobenzene. A 1" x 6" panel of aluminum silicon alloy used in Example III was immersed in the coloring solution at 100° C. for ten minutes. The finished panel had a royal blue color of excellent light fastness.

*Example XVIX*

The procedure of Example XVIII was repeated using as a colorant the product obtained from coupling diazotized aniline with 2-naphthol (C.I. Solvent Yellow 14). The finished panel had a bright orange color of excellent light fastness.

*Example XX*

The procedure of Example XVIII was repeated using as a colorant the product obtained by coupling diazotized ortho-toluidine with 2,5-xylidine, diazotizing the intermediate product formed and then coupling with 2-naphthol (C.I. Solvent Red 26). The finished panel had a deep red color of excellent light fastness.

*Example XXI*

The procedure of Example XVIII was repeated using as the colorant a mixture of the dyestuffs used in Examples XVIX and XX. The finished panel had a strong bright orange color of excellent light fastness.

*Example XXII*

The procedure of Example XVIII was repeated using as a colorant the product obtained by coupling diazotized aniline with N,N-dimethyaniline (C.I. Solvent Yellow 2). The finished panel had a dull yellow color of excellent light fastness.

*Example XXIII*

The procedure of Example XVIII was repeated using as a colorant 1,4-diisopropylaminoanthraquinone. The finished panel had a reddish violet color of excellent light fastness.

Example XXIV

The procedure of Example XVIII was repeated using as a colorant alphamethylaminoanthraquinone. The finished panel had a strong, bright red color of excellent light fastness.

Example XXV

The procedure of Example XVIII was repeated using as a colorant 1,4-di-p-toluidinoanthraquinone (C.I. Solvent Green 3). The finished panel had a dark navy blue color of excellent light fastness.

Example XXVI

The procedure of Example XVIII was repeated using as a colorant the product formed by fusing 2-methoxybenzanthrone with caustic potash (C.I. Vat Green 1). The dye bath comprised a 1 percent solution of the dye dissolved in a 50:50 mixture of quinoline and nitrobenzene. Dyeing was accomplished at 50–60° C. The finished panel had a bright olive shade of excellent light fastness.

We have also found that the depth of shade of the colored aluminum may be greatly enhanced by a careful control of the drying conditions after the application of the dye solution, and before the sealing step. This enhancement of color is obtained by heating the aluminum containing adsorbed colorant in an oven at a temperature of about 100 to 125° C. for a sufficient time to remove all traces of occluded solvent. This treatment completely eliminates any danger of the streaking occasioned by the bleeding of occluded solvent through the oxide pores during the sealing operation. The heating time depends upon the nature of the solvent used, although generally a five to ten minute period is sufficient.

We claim:

1. Method of coloring oxide-coated aluminum comprising applying a coloring solution of at least 0.01 percent by weight of an organic water-insoluble colorant dissolved in a liquid substantially water-immiscible aromatic solvent having a boiling point of at least about 80° C. to aluminum having an artificially produced oxide coating thereon at a temperature between ambient temperature and the boiling point of said solvent.

2. Method of coloring oxide-coated aluminum comprising forming a coloring solution consisting essentially of an organic, water-insoluble colorant dissolved in a liquid substantially water-immisicible aromatic solvent having a boiling point of at least about 80° C., applying said solution to aluminum having an artificially produced oxide coating thereon at a temperature ranging between ambient temperature and the boiling point of said solvent, and sealing the oxide pores of said aluminum.

3. Method of coloring anodized aluminum comprising forming a coloring solution consisting essentially of from about 0.01–5 percent by weight of an organic, water-insoluble colorant dissolved in a liquid substantially water-immiscible aromatic solvent having a boiling point of at least about 80° C., contacting anodized aluminum with said solution at a temperature ranging between about 20° C. and the boiling point of said solvent for up to about ten minutes, and sealing the anodic pores of said aluminum.

4. Method according to claim 3 wherein the anodic pores are sealed by the oxide-coated aluminum containing adsorbed colorant in a hot aqueous bath containing a metal acetate.

5. Method of coloring anodized aluminum comprising forming a coloring solution consisting essentially of from about 0.5–2 percent by weight of an organic, water-insoluble colorant dissolved in a liquid substantially water-immiscible aromatic solvent having a boiling point of at least about 80° C., and applying said coloring solution to anodized aluminum at a temperature ranging between 50–70° C.

6. Method according to claim 5 wherein said solvent is nitrobenzene.

References Cited in the file of this patent

UNITED STATES PATENTS

| | | |
|---|---|---|
| 1,096,060 | Schmidt et al. | May 12, 1914 |
| 2,614,912 | Rice | Oct. 21, 1952 |
| 2,830,062 | Lodge | Apr. 18, 1958 |
| 2,888,388 | Stiller | May 26, 1959 |

FOREIGN PATENTS

| | | |
|---|---|---|
| 593,239 | Great Britain | Oct. 13, 1947 |
| 1,140,000 | France | July 9, 1957 |

OTHER REFERENCES

Light Metals, October 1949, pp. 536–542.

Lubs: The Chemistry of Synthetic Dyes and Pigments, ACS Monograph Series No. 127, Book Division, Reinhold Publishing Corp., New York, 1955. Pages 167, 174–177, 336–404, 413, 417–424, 655.

UNITED STATES PATENT OFFICE
CERTIFICATION OF CORRECTION

Patent No. 2,975,081                     March 14, 1961

Ben H. Kirby, Jr., et al.

It is hereby certified that error appears in the above numbered patent requiring correction and that the said Letters Patent should read as corrected below.

Column 2, line 10, for "automatic" read -- aromatic --; column 11, line 21, for "the", first occurrence, read -- The --; column 12, line 45, for "rainsed" read -- rinsed --; column 13, line 6, for "a "Fade-O-Meter," which" read -- a "Fade-O-Meter", which --; column 14, line 31, for "grenish" read -- greenish --.

Signed and sealed this 8th day of August 1961.

(SEAL)
Attest:

ERNEST W. SWIDER
Attesting Officer

DAVID L. LADD
Commissioner of Patents